United States Patent [19]

Kessler

[11] 4,446,333

[45] May 1, 1984

[54] FLEXIBLE ACOUSTIC COUPLER

[75] Inventor: Bayard F. Kessler, Woodland Hills, Calif.

[73] Assignee: Novation, Inc., Chatsworth, Calif.

[21] Appl. No.: 311,173

[22] Filed: Oct. 14, 1981

[51] Int. Cl.³ .............................................. H04M 11/00
[52] U.S. Cl. .................................................... 179/2 C
[58] Field of Search ....................... 179/1 C, 2 C, 6.12

[56] References Cited

U.S. PATENT DOCUMENTS

| 3,657,479 | 4/1972 | Sweenie et al. | 179/2 C |
|---|---|---|---|
| 4,158,106 | 6/1979 | Mason | 179/2 C |
| 4,162,373 | 7/1979 | Ingber | 179/2 C |
| 4,252,996 | 2/1981 | D'Agostino | 179/2 C |
| 4,268,721 | 5/1981 | Nielson et al. | 179/2 C |

Primary Examiner—A. D. Pellinen
Assistant Examiner—W. J. Brady

Attorney, Agent, or Firm—Blakely, Sokoloff, Taylor & Zafman

[57] ABSTRACT

An acoustic coupler such as commonly used to receive and transmit data between computer terminals over telephone lines. The acoustic coupler is constructed in two halves joined by a flexible hinge which permits the two halves to move laterally and rotationally (about the hinge) with respect to each other. Each half of the acoustic coupler is also provided with a strap for securing the telephone handset portion in place upon the acoustic coupler halves. Once secured in place the telephone handset portion can be used as a "handle" to pick up and move the acoustic coupler from place to place. One half of the acoustic coupler contains a speaker, the other half contains a microphone, which may be electrically coupled to one another by electrical paths passing through, or forming a part of, the flexible hinge member.

11 Claims, 11 Drawing Figures

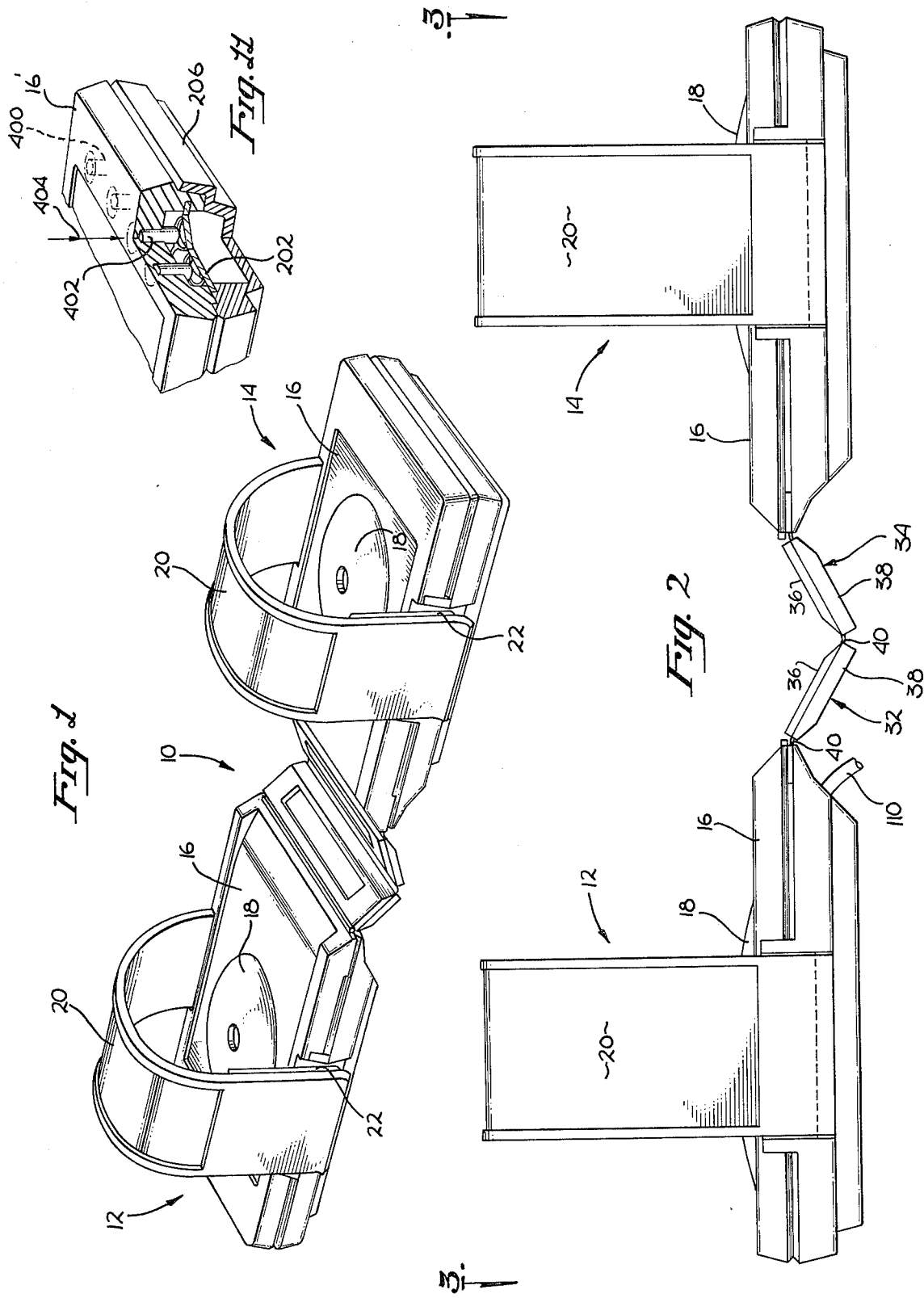

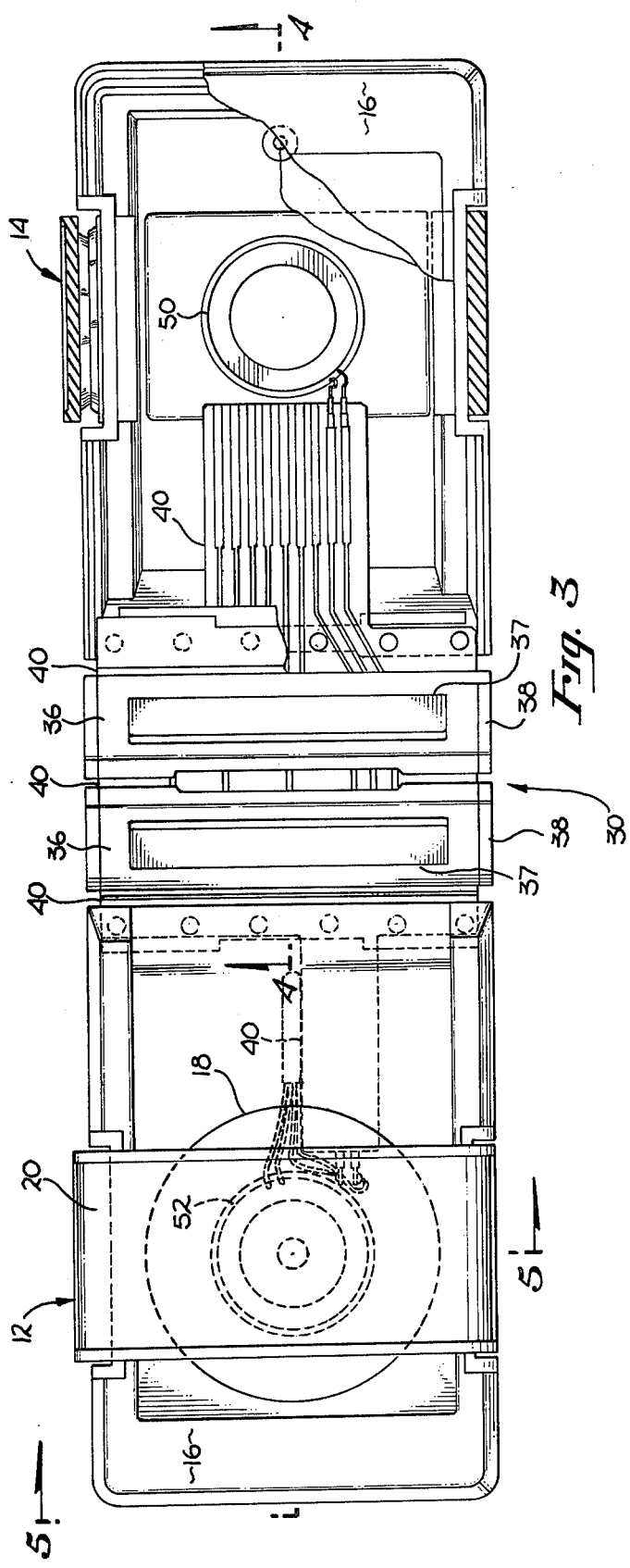
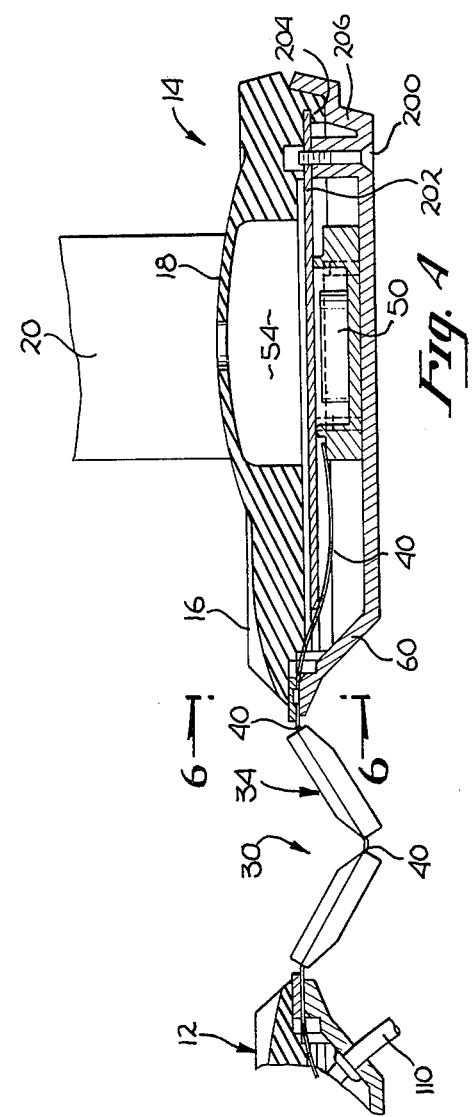
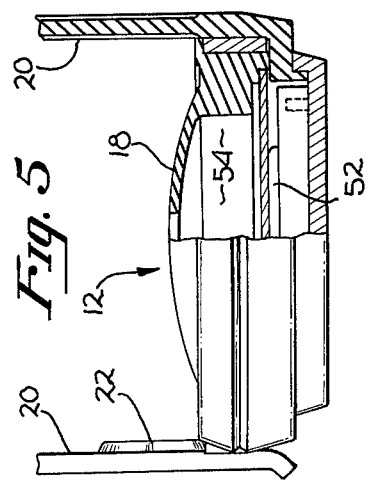

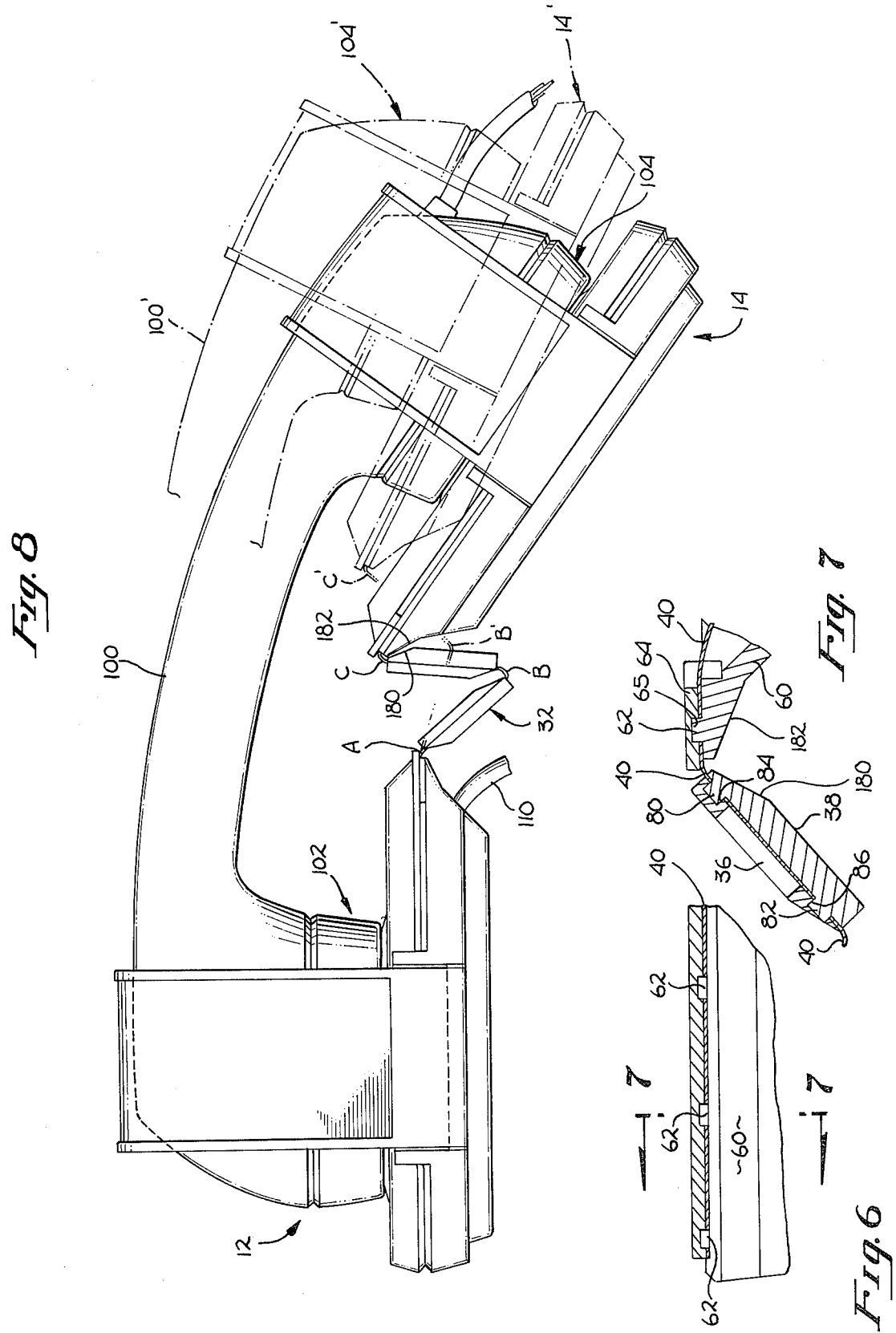

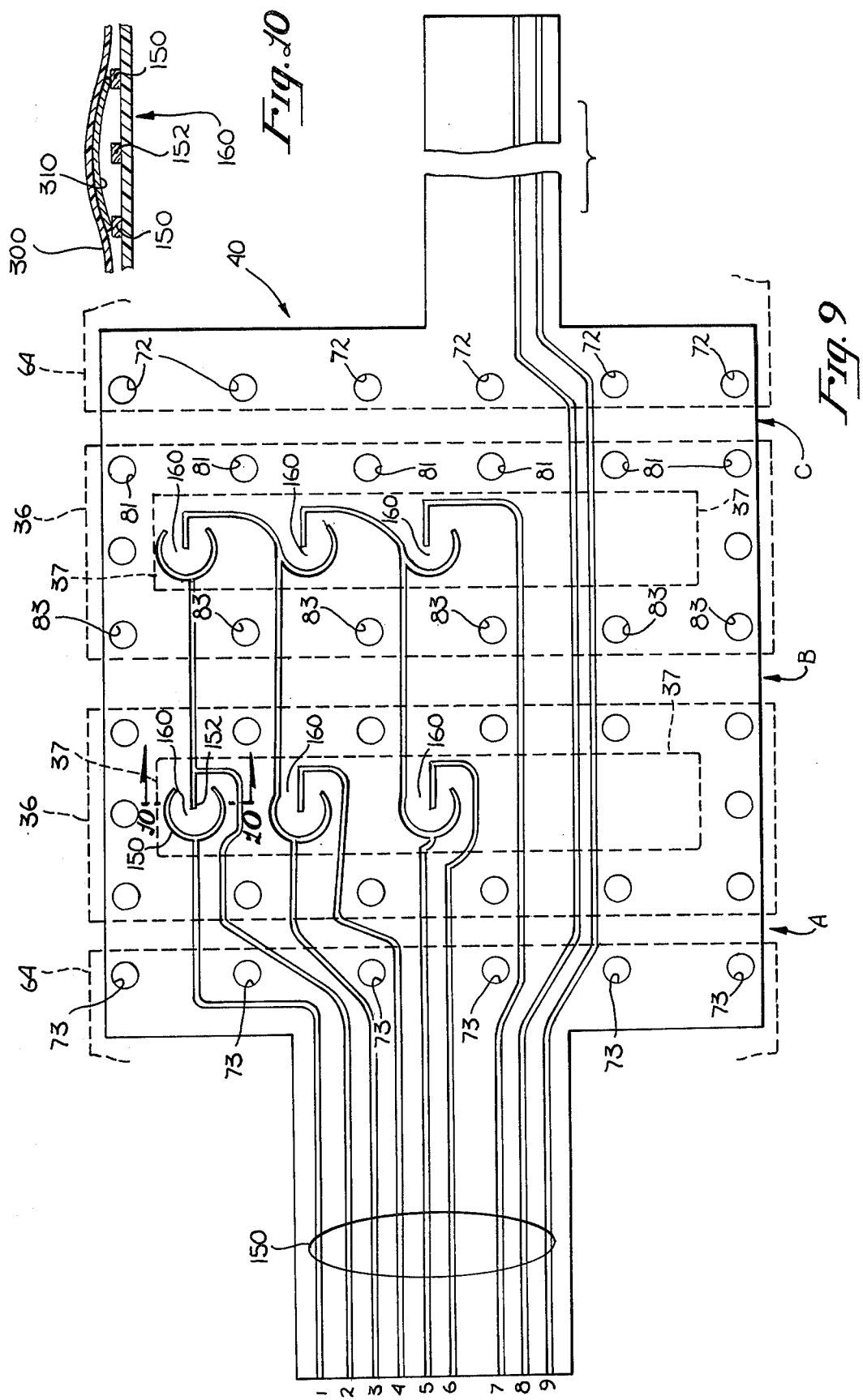

FLEXIBLE ACOUSTIC COUPLER

BACKGROUND OF THE INVENTION

1. Field of the Invention

The present invention relates to the field of communication devices and more particularly, to communication devices for acoustic coupling to a telephone handset for transmitting information thereto, and receiving information therefrom.

2. Prior Art

The preferred embodiment of the present invention is directed to an acoustic coupler for coupling to the handset of a telephone for purposes of digital communication over the phone line and accordingly, the prior art with respect thereto will be described herein. It is to be understood however, that the invention is not necessarily so limited, as the coupler could also be used to couple voice or synthesized voice to and/or from a telephone handset, or may be combined with an integral modem to provide full modem capabilities, by way of specific example.

For many years it has been common to use modems for digital communication over phone lines between a central computer and remote terminals, such modems of course being modulator-demodulator sets for modulating the digital information in some manner so as to be transmitted within the frequency range of conventional phone systems. Such devices may either directly connect to the phone line to directly send and receive electrical signals, or may be acoustic coupled to the telephone handset to acoustically couple signals to and acoustically receive signals from the handset. While direct connect devices have certain advantages (i.e., lack of deterioration by the acoustic devices) and the newer modular plug phone systems very easily allow direct connecting to the phone line, there is still a large percentage of installed phone systems which do not readily allow such direct connect devices. Consequently, there is, and will remain for some time yet, a very substantial market for acoustic couplers and acoustic coupled devices.

In the prior art, acoustic couplers, whether separate devices or integral with a modem, have been generally characterized as having a rigid body supporting a microphone and speaker in the appropriate orientation with some form of soft, flexible and/or elastic member over the speaker and microphone in such a disposition as to mate with the face of the mouthpiece and earpiece of the conventional telephone handset. Such couplers work well where the dimensions of the handset are well known, though depending upon the shape and flexibility of the members directly contacting the mouthpiece and earpiece of the handset, have very little capability of accomodating any significant variations therein. In particular, even with the so called conventional handsets relatively large variations in the actual dimensions thereof may be encountered, particularly in foreign countries, an important consideration in that the market for the type of device being herein discussed is a very international market. In addition, in recent years, the various telephone companies, including the independent phone equipment companies, have offered a variety of phone configurations such as, by way of example, the Princess type phone which, while having a mouthpiece and earpiece disposed so as to be oriented adjacent a user's mouth and ear respectively, have a configuration of the mouthpiece and the earpiece surface, as well as the separation and angularity between the mouthpiece and earpiece of the phone which differ substantially from design to design. It is these various configurations which heretofor the prior art acoustic couplers, whether incorporating a modem or not, could not accommodate.

SUMMARY OF THE INVENTION

An acoustic coupler such as commonly used to receive and transmit data between computer terminals and digital computers over telephone lines. The acoustic coupler is constructed in two halves joined by a flexible region or hinge which permits the two halves to move laterally and rotationally (about the hinge) with respect to each other. Each half of the acoustic coupler is also provided with a strap for securing the telephone handset portion in place upon the respective acoustic coupler half. One half of the acoustic coupler contains a speaker, and the other half contains a microphone, which may be electrically coupled to one another by electrical paths passing through, or forming a part of, the flexible hinge member. The flexibility of the coupler allows the use of the coupler with phones of varied design and proportions.

BRIEF DESCRIPTION OF THE DRAWINGS

FIG. 1 is a perspective view of one embodiment of the acoustic coupler of the present invention.

FIG. 2 is a rear elevational view of the acoustic coupler of FIG. 1.

FIG. 3 is a top plan view showing the right hand half of the acoustic coupler in partial cutaway.

FIG. 4 is a cross sectional view taken along the line 4—4 of FIG. 3.

FIG. 5 is a partial cutaway of the left hand half of the acoustic coupler taken along the line 5—5 of FIG. 3.

FIG. 6 is a cross sectional view of an end of one of the halves of the acoustic coupler.

FIG. 7 is a cross sectional, taken at right angles to the cross sectional of FIG. 6, showing the connection between the flexible hinge means and one half of the acoustic coupler.

FIG. 8 shows the acoustic coupler in a flexed position with a phone handset strapped in place.

FIG. 9 shows the flexible Mylar sheet which joins the hinge means to each half of the acoustic coupler of FIG. 1.

FIG. 10 is a detail cross section of one form of switch means that may be used with the Mylar sheet to make electrical connections.

FIG. 11 is a cross sectional view of a portion of one of the halves of the acoustic coupler showing on implementation of electrical switching means.

DETAILED DESCRIPTION OF THE INVENTION

FIG. 1 is a perspective view of one embodiment of acoustic coupler configured according to the present invention to allow a significant amount of movement of one half of the acoustic coupler with respect to the other half in order to accommodate telephone handsets of varying size and/or configuration. The acoustic coupler 10 comprises a left half member 12 and a right half member 14 which externally are mirror images of one another. Each half member is provided with a substantially pliable pad 16, having an apertured hollow dome 18, preferably of a rubber or rubber like material, such as a silicone rubber. The pad 16 and dome 18 are dimensioned to conform to the form of the telephone speaker and microphone when the telephone is positioned thereon as in FIG. 8. Each half 12 and 14 is further provided with a strap 20, one end of which is securely affixed to its respective half (12 or 14) and the other end of which is releasably secured to its respective half by fastening means such as hook and eye Velcro fasteners 22.

The left half member 12 and right half member 14 are flexibly coupled to one another by flexible hinge means 30. Hinge means 30 may take on any number of forms, but as shown in FIG. 2, according to applicant's invention, preferably comprises a left hinge panel 32 and a right hinge panel 34. Each of panels 32 and 34 further comprises a top plate 36 and a lower plate 38 which are provided with matingly engageable pins and holes as shown in greater detail in FIGS. 6 and 7. The pins and holes may be sonically or solvent welded together, or otherwise fastened such as by being sized to effect a snap fit between the top plates 36 and bottom plates 38. Secured between the top plates 36 and bottom plates 38 is a sheet 40 of flexible material (e.g. Mylar) suitably apertured to fit over the pins which form a part of the snap fit. The sheet 40 is also secured to one end of each of halves 12 and 14, whereby the sheet 40 and hinge panels 32 and 34 provide a flexible hinge means 30 therebetween.

Although the two half members 12 and 14 are externally the mirror image of one another, their contents are significantly different. One half, e.g. left half member 12 may contain a speaker 50 and the other half 14 will contain a microphone 52. When placed in position on the acoustic coupler 10, the mouthpiece of the telephone handset must be placed on the half member 12 or 14 containing the speaker 50. Similarly the ear piece of the telephone must be placed on the half member containing the microphone 52. A small cavity 54 shown in FIGS. 4 and 5, is located beneath each dome 18 between the speaker 50 of the acoustic coupler and the microphone of the phone, and between the microphone 52 of the acoustic coupler and the speaker of the phone.

The structure by which the sheet 40 is secured to an end of a half member 12 or 14 is best shown with reference to FIGS. 6 and 9. FIG. 6 is a cross sectional taken along the line 6—6 of FIG. 4. The base 60 of half member 14 is provided with a plurality of spaced apart pins 62 sized and spaced to correspond with the size and spacing of holes 72 in Mylar sheet 40. A top plate 64 is provided with recesses 65 sized and spaced to fit over the pins 62 securing the Mylar sheet 40 in place between plate 64 and base 60. The other end of Mylar sheet 40 is similarly secured in place between a base and top plate, by pins passing through holes 73.

Hinge panels 32 and 34 are similarly constructed. Each panel 32 and 34 comprises a bottom plate 38 having upwardly projecting rows of pins, e.g. pins 80 and 82 of right hinge panel 34. Pins 80 and 82 pass upward through holes 81 and 83 respectively and are received into recesses 84 and 86 respectively of top plate 36. The flexible Mylar sheet thus extends from one half member (12 or 14) to the other, through the two hinge panels 32 and 34.

Because the flexible Mylar sheet 40, extending between a left half member 12 and a right half member 14, is provided with two hinge panels 32 and 34, three flexible joints A, B and C are formed. Joint A is between the left half member 12 and hinge panel 32. Joint B is between hinge panel 32 and hinge panel 34. Joint C is between hinge panel 34 and right half member 14. Rotation can occur about any joint or combination of joints in varying amounts. The left half member 12 and right half member 14 can thus be moved relative to one another to accommodate telephone hand sets 100 of various sizes and having a variety of angular orientations between the plane of the mouthpiece 102 and the plane of the earpiece 104.

Mylar is preferred as the flexible sheet material because of its ability to undergo substantial flexing on a repeated basis without cracking or other deterioration, and the relative ease with which electrically conductive paths capable of similarly flexing may be applied thereto by conventional thick film processes. In that regard, it will be noted that the members which make up hinge panels 32 and 34 are so designed that the extent of flexing of the sheet 40 is limited thereby so that the elastic range of the Mylar sheet is not exceeded. By way of example, surfaces 190 and 182 (see FIG. 8) will come face to face at the limit of flexing of the hinge region C while still leaving a relatively generous radius on the Mylar material in that hinge region. Further, the members making up the hinge panels 32 and 34 are also configured so that hinge joints A and C will flex only in one direction, specifically as shown in FIG. 8, while hinge joint B will only flex in the opposite direction, thereby providing full flexibility while still positively defining the possible motion of the parts.

As shown in FIG. 8, the joints may undergo rotation to move from their original positions of A, B and C to new positions A, B' and C'. Such movement would allow the acoustic coupler 10 to accommodate a telephone handset 100' having an overall length greater than handset 100 and having less angular displacement between the planes of the mouthpiece and earpiece, whether of a conventional handset style, or of a newer style, such as by way of example, the Princess or Princess type handsets or even the folding type phones.

Once the handset is properly positioned onto the two half members 12 and 14, the straps 20 are placed around the handset and secured in place such as by Velcro fasteners. Handset 100 is connected to the standard telephone lines via cord 120. Acoustic coupler 10 is coupled to a data processing device, i.e. computer, through cord 110.

As an alternate embodiment, a modulator-demodulator (a MODEM) may be packaged to fit within and be placed inside of the body of acoustic coupler 10, e.g. within either left half member 12, right half member 14, or partially contained in each, if desired. The electronics may conveniently be mounted upon a circuit board such as board 202 located within right half member 14 as shown in FIG. 4. The board 202 as shown also serves to secure the pliable rubber or rubber like pad 16 in place upon its base 60. By tightening screw 200, mounted upon base 60 and passing through the board 202, the board is drawn toward the base 60 compressing the lip 204 of pad 16 between the board 202 and a shoulder 206 of base 60. This compressing secures and retains the pad 16 upon the base 60. Either a similar dummy board is used on the other half of the coupler or the electronics may be divided between the two sides.

Whether a MODEM is incorporated within the half members 12 or 14 or not incorporated, appropriate electrical connections may be made between the two half members by providing printed circuit paths upon the Mylar sheet 40, such as paths 150. Also, if desired, electrical switches may be mounted upon the top plates 36 within windows 37 to close any of the electrical contact pairs 160. For example, FIG. 10 shows electrical paths 150 and 152 located upon Mylar sheet 40. To close the connection between paths 150 and 152, an upper Mylar sheet 300 provided with appropriate dome like areas may be provided with a length of electrical conductor such as 310. When the dome is depressed, conductor 310 will connect path 152 with path 150 thereby closing the switch. Of course other configurations of circuit paths and switch closures could be provided as desired. Finally, the hinge could be fabricated with some other construction, such as by way of example a silicon rubber connecting member for full flexibility, through in such a case separate wire connections between the two halves would perhaps be best.

Electrical switches may also be provided as shown in FIG. 11 hidden from view beneath the surface of pad 16'. The actual electrical switch mechanism would be as shown in FIG. 10 and pad 16' would have a number of cavities 400 therein to receive in each cavity a shaft 402. The bottom end of the shaft 402 would rest on the top of the upper Mylar sheet 300 (shown in FIG. 10) above a conductor 310 and a path 152. By pressing downward on the surface of pad 16' so as to exert a downward force indicated by arrow 404, the shaft 402 is moved down and causes the switch (as in FIG. 10) to close as explained above. The surface of pad 16' would be provided with appropriate indicia to indicate the location of the switch and the functions activated by operating the switch.

While the invention has been described with reference to the FIGS. 1 through 10 and the particular embodiments illustrated thereby, it should be understood that many changes in material and structure may be made by one of ordinary skill in the art without departing from the spirit and scope of the invention. The description and Figures are given for illustrative purposes and are not to be interpreted as limitations upon the invention. The scope of the invention is intended to be fully as broad as that set forth in the appended claims.

What is claimed is:

1. An acoustic coupler comprising:
   a first half member housing a speaker therewithin;
   a second half member housing a microphone therewithin;
   a flexible hinge means coupling said first half member to said second half member, said flexible hinge means having at least three substantially parallel predefined hinge axes, said flexible hinge means being a means for enabling the position and orientation of said first half member to be independently varied with respect to said second half member through a predetermined range of relative spatial positions and angular orientations with good flexibility with respect to the degrees of freedom required to mate said acoustic coupler with substantially all telephone handsets while providing substantial resistance to relative motion unnecessary to such proper mating and tending to make the use of said acoustic coupler inconvenient and cumbersome.

2. An acoustic coupler comprising:
   a first half member housing a speaker therewithin;
   a second half member housing a microphone therewithin;
   a flexible hinge means coupling said first half member to said second half member, said flexible hinge means comprising:
   a flexible sheet of material;
   a first hinge panel mounted upon said sheet;
   a second hinge panel mounted upon said sheet being secured to said first half member;
   a first portion of said flexible sheet being secured to said first half member;
   a second portion of said flexible sheet being secured to said second half member;
   said first and second hinge panels being secured on said sheet between said first and second portions to form three hinge joints;
   whereby the position and orientation of said first half member may be varied with respect to said second half member and whereby flexing of said joints may vary the distance between, and the angular orientation of, said first and second half members.

3. The acoustic coupler according to claim 2 further provided with a means for securing a telephone handset to said acoustic coupler, said means for securing comprising:
   a pair of straps, one end of each of said pair of straps being secured to a respective one of said half members; the other end of each of said pair of straps being provided with means for releasably securing said other end to said respective half-member.

4. The acoustic coupler according to claim 3 wherein said means for releasably securing comprises cooperatively disposed hook and eye members for effecting interlock on contact and non-destructive detachment using moderate force.

5. The acoustic coupler according to claim 3 wherein said flexible sheet material is polyster film.

6. The acoustic coupler according to claim 2 wherein said flexible hinge means is provided with conductive means thereon for effecting electrical connections between said first half member and said second half member so that said conductive means may be flexed in conjunction with said flexible hinge.

7. An acoustic coupler comprising:
   a first half member housing a speaker therewithin;
   a second half member housing a microphone therewithin;
   means for securing a telephone handset upon said first and second half members with the mouthpiece of said handset proximate said microphone;
   a flexible hinge means coupling said first half member to said second half member, said flexible hinge means comprising:
   a flexible sheet of material;
   a first portion of said flexible sheet being secured to said first half member;
   a second portion of said flexible sheet being secured to said second half member;
   a first hinge panel mounted upon said sheet;
   a second hinge panel mounted upon said sheet in spaced apart relation with said first hinge panel;
   said first and second hinge panels being secured on said sheet between said first and second portions to form three hinge joints;
   whereby flexing of said joints will vary the distance between, and the angular orientation of said first and second half members.

8. The acoustic coupler according to claim 7 wherein said flexible sheet of material is polyester film.

9. The acoustic coupler according to claim 7 wherein said flexible sheet of material is provided with conductive means as an integral part thereof for effecting electrical connections between said first half member and said second half member.

10. The acoustic coupler according to claim 7 further provided with a means for securing a telephone handset to said acoustic coupler.

11. An acoustic coupler comprising:
  a first assembly housing a speaker therewithin;
  a second assembly housing a microphone therewithin;
  means for securing a telephone handset upon said first and second assemblies with the mouth piece of said handset proximate said speaker and the earpiece of said handset proximate said microphone;
  flexible means coupling said first assembly to said second assembly, said flexible means comprising:
  a flexible sheet of material;
  a first hinge panel mounted upon said sheet;
  a second hinge panel mounted upon said sheet in spaced apart relation with said first hinge panel;
  a first portion of said flexible sheet being secured to said first assembly;
  a second portion of said flexible sheet being secured to said second assembly;
  said first and second hinge panels being secured on said sheet between said first and second portions to form three hinge joints;
  whereby the position and orientation of said first and second assemblies may be varied to correspond to the position and orientation of said mouthpiece and said earpiece respectively.

* * * * *